Feb. 8, 1966   O. R. BRINEY, JR., ET AL   3,233,480
ECCENTRICALLY MOUNTED BORING BAR
Filed April 22, 1963   4 Sheets-Sheet 1

INVENTORS
OTIS R. BRINEY JR.,
& JAMES W. BRINEY
BY
WATTS, EDGERTON, PYLE & FISHER

ATTORNEYS

Feb. 8, 1966     O. R. BRINEY, JR., ET AL     3,233,480
ECCENTRICALLY MOUNTED BORING BAR

Filed April 22, 1963                                       4 Sheets-Sheet 2

INVENTORS
OTIS R. BRINEY JR.,
& JAMES W. BRINEY
BY
WATTS, EDGERTON, PYLE & FISHER

ATTORNEYS

Feb. 8, 1966  O. R. BRINEY, JR., ET AL  3,233,480
ECCENTRICALLY MOUNTED BORING BAR
Filed April 22, 1963  4 Sheets-Sheet 3

INVENTORS
OTIS R. BRINEY JR.,
& JAMES W. BRINEY
BY
WATTS, EDGERTON, PYLE & FISHER

ATTORNEYS

Feb. 8, 1966   O. R. BRINEY, JR., ET AL   3,233,480
ECCENTRICALLY MOUNTED BORING BAR

Filed April 22, 1963                                     4 Sheets-Sheet 4

INVENTOR.
OTTIS R. BRINEY JR.
JAMES W. BRINEY
BY
ATTORNEY

United States Patent Office 3,233,480
Patented Feb. 8, 1966

3,233,480
ECCENTRICALLY MOUNTED BORING BAR
Ottis R. Briney, Jr., and James W. Briney, Pontiac, Mich., assignors to Briney Manufacturing Company, Pontiac, Mich., a corporation of Michigan
Filed Apr. 22, 1963, Ser. No. 276,122
9 Claims. (Cl. 77—58)

The present application is a continuation-in-part of application Serial No. 73,610, filed December 5, 1960, entitled "Eccentrically Mounted Boring Bar" and now abandoned.

This invention pertains to boring and more particularly to a novel and improved apparatus for boring a hole in a workpiece.

One of the problems in boring holes is a mark or groove left on the workpiece during the return of a cutting tool to the starting position. The mark, depending upon its depth, may damage and even ruin the workpiece for its intended purpose.

There have been prior proposals for boring tool mechanisms which are capable of moving the cutting tool away from the bore surface before returning the cutting tool to the starting position. However, these prior proposals have generally been quite complicated and subject to failure. Moreover, they do not always positively withdraw the cutting tool from the workpiece before commencing the return stroke. Finally, these prior proposals have been slow acting and not compatible for use in present high speed boring operations.

The present invention provides a simple and dependable boring tool apparatus which quickly and positively retracts the cutting tool from the workpiece so as not to mar the bore surface during the return stroke. In the apparatus of the present invention, the cutting tool projects from a boring bar which is eccentrically mounted in a rotatable driving head housing. The boring bar is rotatable in the housing between limits to move the cutting tool to any of several cutting positions for cutting at various depths. The bar is rotated by an actuator mechanism at the desired time to shift the cutter radially in either direction. In one form, the actuator mechanism is operated by a tapered actuating bar which positively rotates the boring bar to position the cutting tool at any one of several cutting positions. In another form, the actuator mechanism is centrifugally operated by rotation of the driving head housing. In the latter form the cutting tool is automatically and positively moved to the cutting position when the driving head is rotating above a predetermined speed, and then is moved to the retracted position when the driving head is rotating below a predetermined speed. Thus, by reducing the speed of the cutting tool at the end of the cutting pass, the cutting tool is automatically retracted and cannot engage and scar the workpiece when the cutting tool is returned to the starting position.

The boring apparatus of the present invention is greatly simplified and is capable of boring to two diameters in a single pass with a single cutting tool. Further, either the larger or the smaller bore can be formed first. Thus, it is possible to bore and then bore a larger diameter at the end of the hole remote from the housing supporting the boring bar. In addition, the apparatus of the present invention can cut a recess between the ends of a bore in a single cutting pass.

The present apparatus also permits semi-finish and finish cuts to be formed in a single pass. If semi-finish and finish cuts are to be made in the same pass, the boring bar is advanced relative to the workpiece with the cutting tool in a first cutting position. At the conclusion of the advance and before the return stroke is commenced, the eccentrically mounted boring bar is rotated a predetermined amount by the actuator mechanism to shift the cutter radially outwardly. Thereafter, the bar is fed back to the start position and the finish cut is obtained during the feed back portion of the cutting pass.

Similarly, if a hole is to be bored to two diameters, with the larger diameter at the remote end of the hole, the spindle is advanced part way through the hole with the cutter in its retracted position. When the plane in which the larger bore is to terminate is reached, the cutter is shifted to its outward position and during the remainder of the advance of the cutting tool the hole is bored to the larger diameter. If one wishes to bore the larger diameter and then the smaller, the operation is reversed.

In some instances, as when a substantial amount of material is to be moved during the boring operation, it may be desirable to bore the entire hole during the advance and then bore to a larger diameter during the feed back portion of the cutting pass. This, of course, can be accomplished by shifting the cutter to its outward position during an appropriate part of the feed back to bore to a larger diameter in a selected section of the hole.

Other features and a fuller understanding of the invention may be had by referring to the following description and claims, taken in conjunction with the accompanying drawings, in which:

Figure 1:
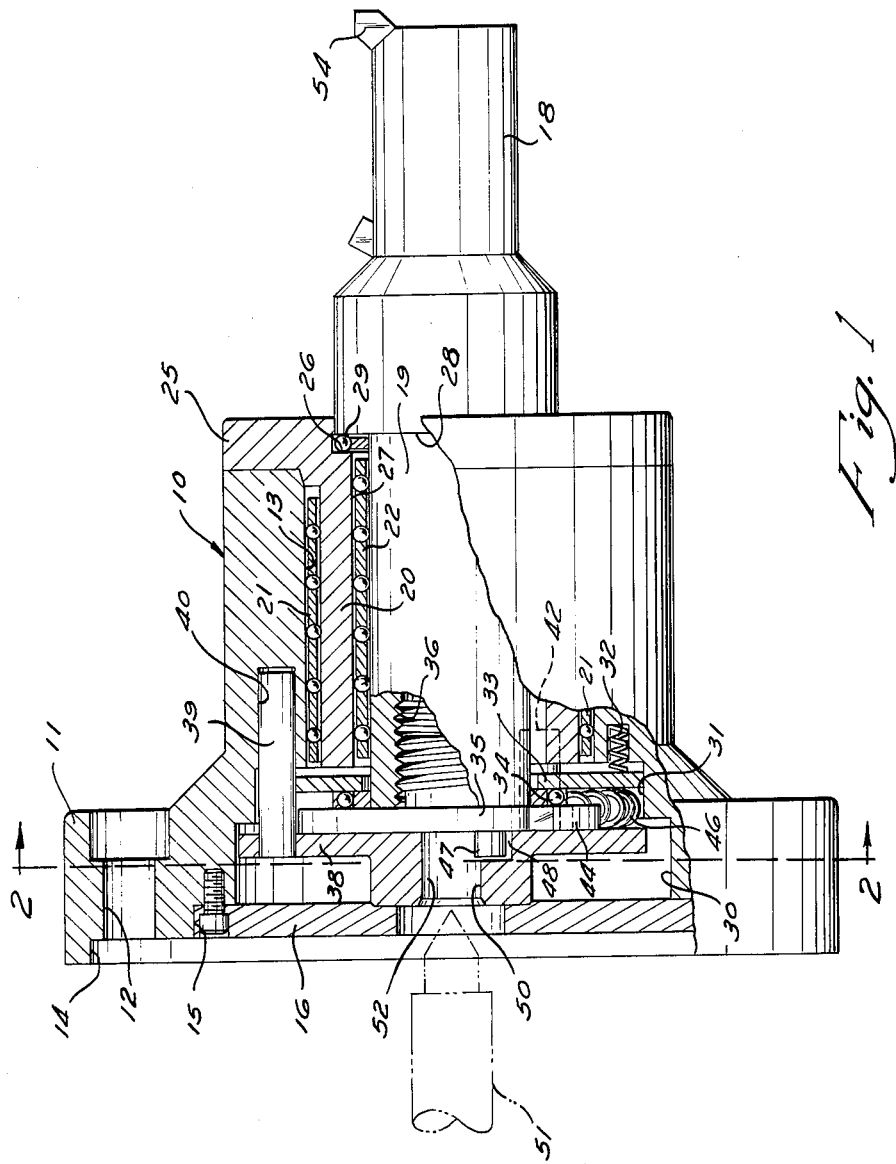
FIGURE 1 is a side elevational view of the driving head assembly of the present invention with parts broken away and shown in section.
Figure 2:
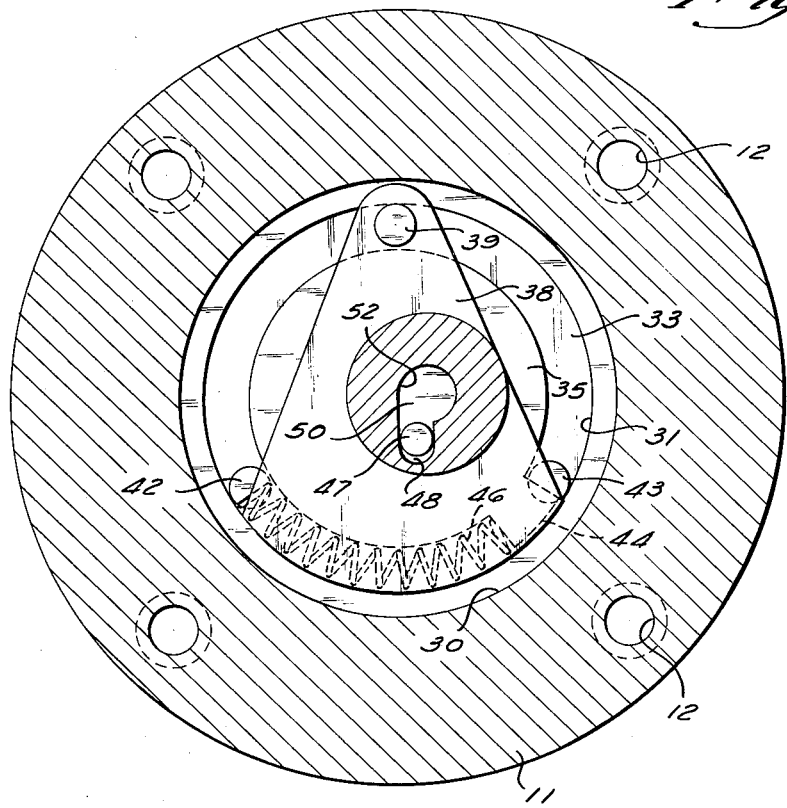
FIGURE 2 is a sectional view of the device as seen from the plane indicated by the line 2—2 of FIGURE 1.
Figure 3:
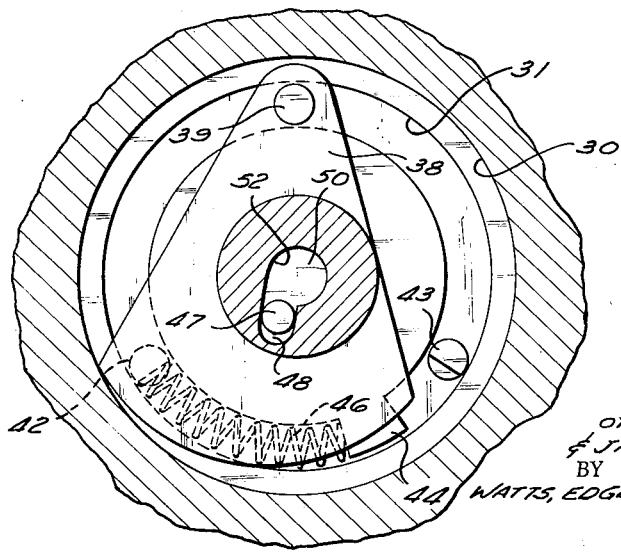
FIGURE 3 is a sectional view, on a reduced scale, of the device as seen from the plane indicated by line 2—2 of FIGURE 1 and with the eccentric rotating mechanism shifted from one position to another.
Figure 4:
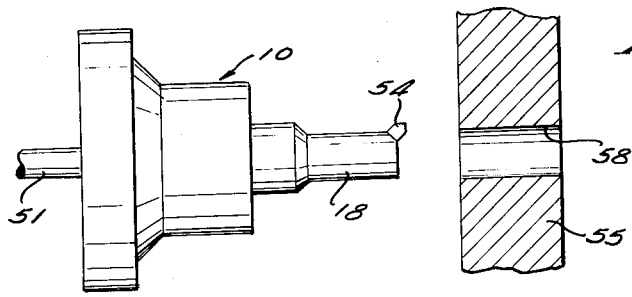
Figure 5:
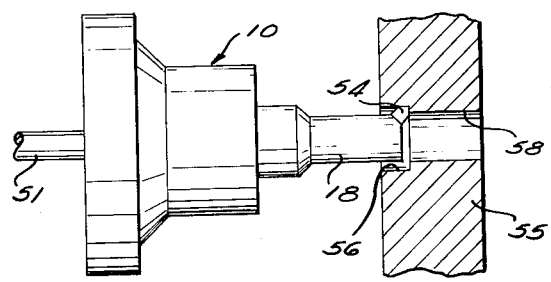
Figure 6:
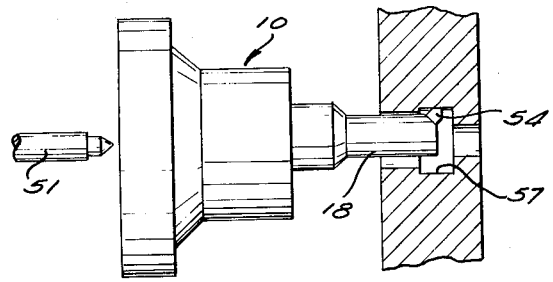
Figure 7:
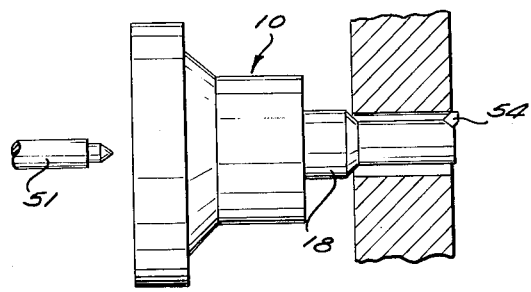
Figure 8:
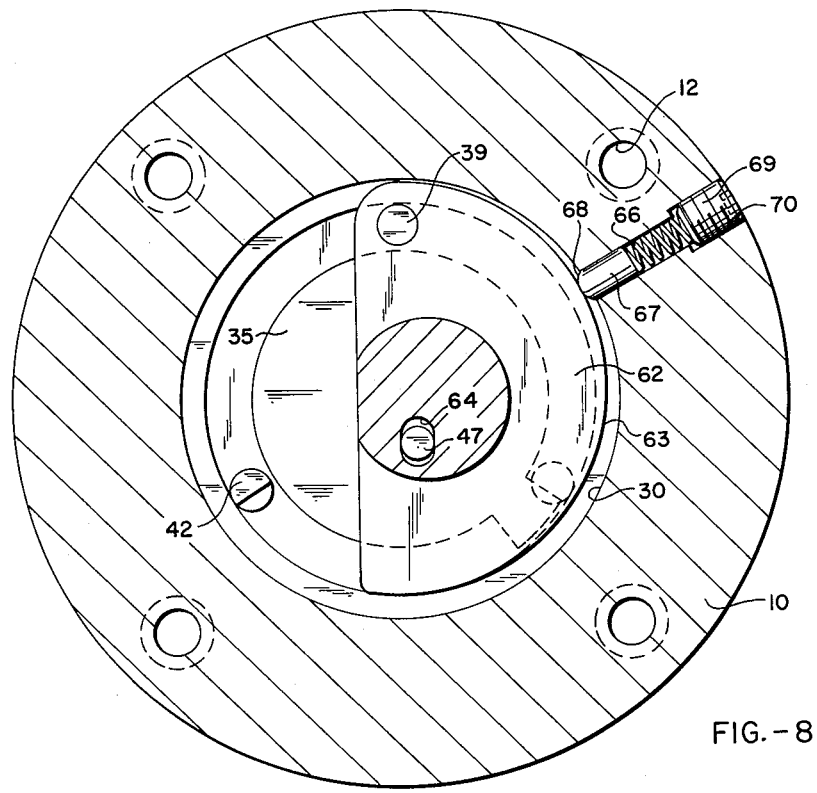
Figure 9:
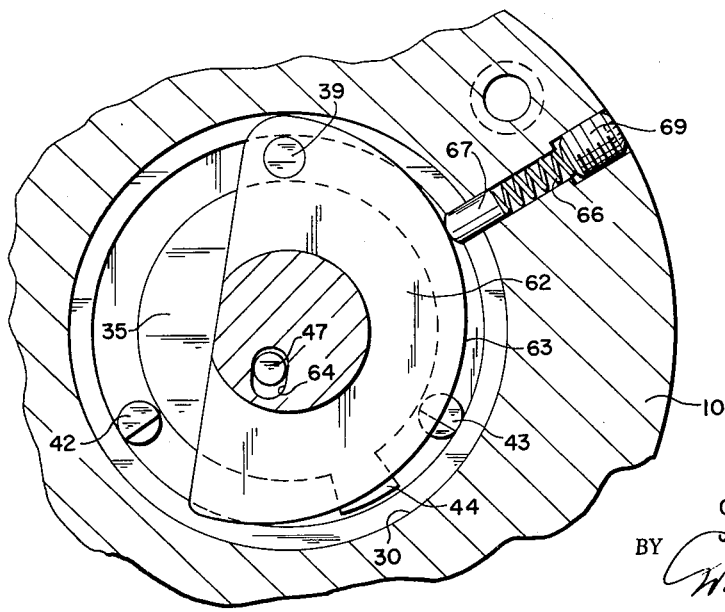

FIGURES 4 through 6 are somewhat schematic views showing the sequential steps of forming bores of two diameters with the eccentric action of the cutting tool being exaggerated for clarity of illustration; and FIGURE 7 is a somewhat diagrammatic view with the eccentric action again exaggerated showing a cutting tool prepared to form the finish cut during the feed back portion of a pass and after a semi-finish cut has been made during the advance portion of a pass;

FIGURE 8 is a sectional view, taken in a plane similar to that for FIGURE 2, of an alternate form of the device of FIGURE 1;

FIGURE 9 is a sectional view similar to FIGURE 8 with the actuator mechanism shifted from one position to another.

Referring now to the drawings, and to FIGURE 1 in particular, a driving head assembly is shown which has a housing 10. The housing 10 has a radially projecting and mounting flange 11 in which a plurality of mounting holes 12 are formed.

The housing 10 has a through bore 13. A large mounting counterbore 14 is provided at the flanged end of the housing 10. The counterbore 14 is concentric with the remainder of the bore 13. The mounting counterbore 14 assists in locating the assembly, radially speaking, when it is mounted on a suitable drive spindle. A second and smaller counterbore 15 is provided adjacent the mounting counterbore 14. The counterbore 15 carries a cover plate 16.

A boring bar 18 which includes a reduced diameter shank 19 is provided. The shank 19 is positioned within the bore 13. An eccentric sleeve 20 is disposed between the shank 19 and the housing 10. A first anti-friction bearing 21 is interposed between the walls of the bore 13 formed in the housing 10 and the eccentric sleeve 20. A second anti-friction bearing 22 is interposed between the eccentric sleeve 20 and the shank 19 of the bar 18. The bearings permit the eccentric sleeve to be selectively rotated relative to both the housing 10 and the bar 18 to adjust the radial position of a supported cutter.

The eccentric sleeve 20 includes a radially projecting end flange 25 which overlies the end of the housing. A counterbore 26 is provided at the flanged end of the eccentric sleeve 20. The counterbore 26 is concentric with inner walls 27 of the sleeve 20. The counterbore 26 and the walls 27 are both eccentric with respect to the bore 13 and the outer surface of the sleeve 20. Since the inner walls 27 are eccentric, it will be seen that the bearing 22 and the shank 19 are both eccentric with respect to the bore 13.

The bar 18 includes a shoulder 28 which projects radially at one end of the shank 19. A ball-type thrust bearing 29 is interposed between the bar shoulder 28 and the base of the sleeve counterbore 26.

An actuating counterbore 30 and an end thrust plate counterbore 31 are provided near the flanged end of the housing. The actuating counterbore 30 is adjacent to the counterbore 15 and concentric to it. The thrust plate counterbore 31 is, in turn, adjacent and concentric with the actuating counterbore 30. Thus the bore 13 and the counterbores 14, 15, 30, 31 are concentric and adjacent one another in a step-like fashion.

A thrust washer 33 is positioned at the base of the end plate counterbore 31. One face of the thrust washer 33 is spaced from the housing 10 and the eccentric sleeve 20. Springs 32 bias the thrust washer rearwardly. A thrust bearing 34 rides against the other face of the thrust washer 33.

A dogged end plate 35 is secured to the shank 19 as by threading into a bore 36 formed in the inner end of the shank 19. The dogged plate 35 rides against the thrust bearing 34. The springs 32 bias the bearing and plate rearwardly to draw the bar in so that the shoulder 28 is in compressing engagement with the thrust balls 29.

An actuating plate 38 is positioned in the counterbore 30. The actuating plate 38 is supported by a pivot pin 39. The pivot pin 39 projects into a pivot bore 40 formed in the housing 10.

A pair of spring retaining dowels 42, 43 project from the housing through the thrust washer 33. The dogged plate 35 has a radially extending lug or dog 44 which projects outwardly from the remainder of the plate and is disposed, circumferentially speaking, between the positioning dowels 42, 43. A dog engaging spring 46 is positioned between the dowel 42 and the dog 44. The spring 46 urges the dog 44 into abutment with the other dowel 43.

An eccentric control pin 47 projects rearwardly from the dogged plate 35. The pin 47 extends into an actuating control slot 48 formed in the actuating control plate 38. An actuating control plate positioning bore 50 is formed in the center of the actuating control plate. In the disclosed and preferred embodiment the actuating bore 50 and the actuating control slot 48 are contiguous and in communication with one another. A tapered end actuating bar 51 is provided. The actuating bar 51 is positioned eccentrically with respect to the positioning bore 50. When the bar 51 is thrust into the bore 50 it acts against side wall 52 to cause the actuating plate 38 to pivot on the pivot 39. Pivoting of the actuating plate 38 causes the walls of the slot 48 to act against the eccentric positioning pin 47. This action shifts the eccentric positioning pin 47 and causes the dogged plate 35 to rotate against the action of the spring 46. As the dogged plate 35 rotates, the connected bar 18 rotates with it.

Since the bar 18 is eccentric with respect to the mounting counterbore 14 and a connected drive spindle, it is eccentric with respect to the axis of rotation. Since the bar 18 is eccentric with respect to the axis of rotation, the eccentric rotation of the bar 18 relative to the housing 10 causes the cutting tool 54 to be shifted, radially speaking, to a position which is a different distance from the axis of rotation than its previous position. It should be noted that while a preferred mechanism for rotating the bar to shift the radial position of the cutter from an advanced to a retracted position and return is shown, other mechanism for obtaining this shifting will be apparent to those skilled in the art.

In FIGURES 4 through 7 the tool is shown schematically. As shown, the cutting radius of the cutting tool 54 is greater with the actuating bar 51 withdrawn from the bore than with it inserted in the bore 50. The converse could be true, depending upon the position of the eccentric sleeve.

In FIGURES 4 through 6 the method of boring a hole 58 to a plurality of diameters is shown. The process comprises first positioning a workpiece 55 relative to the bar 18. The actuating rod 51 is inserted in the bore 50 for the steps shown in FIGURES 4 and 5, and the workpiece and bar are shifted relatively toward one another and rotated relatively. This is continued until a bored section 56 has been formed, FIGURE 5. The actuating rod 51 is then withdrawn and the advancing and relative rotation are continued to form a second diameter in the nature of either a recess or a counterbore 57. If a counterbore-like second diameter is desired, the bar 41 is maintained in a withdrawn position until the cutting tool 54 has passed through the length of the hole 58. Thereafter, the actuating rod 51 is reinserted to retract the cutting tool 54 from its outward position to its inward position and permit a feed-back portion of the cutting pass to be made. If one wishes to form a recess along the central portion of the walls of the hole 58, the actuating rod 51 is simply reinserted at an appropriate time and the remainder of the hole will be bored to the same diameter as the first section 56.

In FIGURE 7 the method wherein semi-finish and finish cuts are accomplished in one pass is shown. Here the semi-finish advance portion of the pass has been concluded. The actuating rod 51 is withdrawn and the boring bar will be fed back relative to the workpiece with the cutter 54 in its extended position. When the bar is so fed back, and of course with relative rotation between the bar and the workpiece 55, the finish cut is performed as the cutting tool is fed back to the original position of FIGURE 4.

FIGURES 8 and 9 show a centrifugally operated actuating mechanism for automatically positioning the cutting tool 54 in a cutting position on the cutting stroke and retracting the cutting tool 54 so as to miss the workpiece during the return stroke. The centrifugal actuating mechanism includes an actuator plate 62 pivotally connected to the housing 10 by the pivot pin 39. The actuator plate 62 is half-moon shaped and includes an outer curved edge surface 63 which conforms to the curvature of the surface of the actuator counterbore 30. The actuator plate 62 has an elongated cam slot 64 which receives the eccentric control pin or pintle 47.

The size and shape of the actuator plate 62 and the locations of the pivot pin 39 and the cam slot 64 are such that the center of mass of the actuator plate is always off-set from the central axis of rotation of the housing 10. The mass of the actuator plate and the location of the center of mass from the central axis of rotation are factors affecting the magnitude of the centrifugal force urging the actuator plate 62 to pivot when the housing 10 commences rotating.

The actuator plate 62 is pivotal within the actuator bore 30 between the position shown in FIGURE 8 where its curved surface 63 is adjacent the surface defining the counterbore and the position shown in FIGURE 9 where the curved surface 63 is away from the counterfore surface 30. Movement of the actuator plate 62 toward the counterbore surface 30 causes the boring bar 18 to rotate within the sleeve 20 and the sleeve 20 to rotate within the housing 10 such that the boring bar rotates eccentrically relative to the housing to move the cutting tool 54 radially outward to a cutting or boring position. Movement of the actuator plate 62 away from the counterbore surface 30 rotates the boring bar 18 and the sleeve 20 relative to each other and relative to the housing 10 to shift the cutting tool 54 radially inward to a retracted position.

The actuator plate 62 is normally biased away from the counterbore surface 30 and near the center of rotation by a spring biased plunger mechanism mounted in a plunger bore 66 in the housing 10. The plunger bore 66 is aligned with the actuator plate 62. A plunger pin 67 is slidably disposed in the plunger bore 66 and includes a rounded end 68 which engages the curved edge surface 63. An adjustment screw 69 is threadably disposed in a threaded counterbore 70. A plunger spring 71 is disposed in the bore 66 between the plunger pin 67 and the adjustment screw 69 and urges the plunger pin 67 against the actuator plate 62.

The size and other characteristics of the spring 71 as well as the compression of the spring by the adjustment screw 69 determines the amount of force urging the actuator plate toward the center of rotation. The center of mass of the actuator plate 62 is closest the center of rotation when the housing 10 is not rotating. As the housing 10 begins to rotate, a centrifugal force urges the actuator plate 62 away from the center of housing rotation and against the action of the plunger spring 71.

The plunger spring 71 is sized so that the housing 10 must attain a minimum rotational velocity before the centrifugal force is sufficient to overcome the resisting force of the plunger spring 71. When this velocity is attained the actuator plate 62 moves about the pivot pin 39 away from the center of housing rotation from the position in FIGURE 9 toward the surface of the counterbore 30 and rotates the dogged plate 38 until the dog 44 abuts the dowel 43 as is shown in FIGURE 8. As the dog 44 moves toward the dowel 43, the boring bar 18 and the sleeve 20 rotate and the cutting tool 54 is radially shifted from a retracted position to a cutting position as was described above. When the housing 10 is rotating at cutting speed the centrifugal force positively drives the dog 44 against the dowel 43 and securely holds it there against any repelling forces occurring during the cutting process.

In conclusion, the present invention may be briefly described as comprising essentially a rotatable driving head, a boring bar mounted within the driving head and movable eccentrically relative to the driving head to radially shift a cutting tool between fully extended and retracted positions, and an actuator mechanism for moving the boring bar to any of several positions between the fully extended and retracted positions. The invention further contemplates that the actuator mechanism automatically causes the boring bar to shift the cutting tool to the cutting position when the driving head is rotating above a predetermined speed and to retract the cutting tool when the driving head is rotating below a predetermined speed.

Although the invention has been described in its preferred form with a certain degree of particularity it is understood that the present disclosure of the preferred form has been made only by way of example, and that numerous changes in the details of construction and the combination and arrangement of parts may be resorted to without departing from the spirit and the scope of the invention as hereinafter claimed.

What is claimed is:

1. A driving head for supporting and driving a cutting tool, said driving head comprising:
    (a) a housing member mounted for rotation about a central axis;
    (b) a boring bar member carried by said housing member, said bar member being rotatable relative to said housing member about an axis spaced and parallel to said central axis;
    (c) the cutting tool being secured to said bar member and movable eccentrically relative to said central axis when said bar member is rotated relative to said housing member;
    (d) said housing and bar members including coacting stop portions to permit rotation of said bar member relative to said housing member only between fixed predetermined limits;
    (e) a half-moon shaped actuator plate disposed inside said housing member and having one end pivotally secured to said housing member, said plate having its center of mass disposed off-center of said central axis of rotation so that rotation of said housing member centrifugally forces said actuator plate to move away from said central axis;
    (f) means operatively connecting said bar member to said actuator plate to rotate said bar member between said fixed limits relative to said housing member when said actuator plate is moving relative to said central axis; and,
    (g) bias means interposed between said housing member and said actuator plate, said bias means urging said actuator plate to a position near said central axis where relative member rotation is topped at one of said fixed limits, and said bias means resisting movement of said actuator plate until the housing is rotating at a predetermined speed at which the centrifugal force overcomes the resisting force of said bias means and said actuator plate moves to a position away from said central axis where relative member rotation is stopped by the other of said fixed limits.

2. The combination of claim 1 wherein said operatively connecting means comprises a pintle axially extended from said boring bar member, located eccentrically relative to the axis of the boring bar, and disposed in a slot in said plate.

3. The combination of claim 2 wherein said stop portions comprise a lug circumferentially extended from said boring bar and a pair of stops disposed on opposite sides of said lug and angularly spaced to provide said fixed limits of relative member rotation.

4. A driving head for a boring tool adapted to facilitate withdrawal of the bar without marring the surface of the bore in a workpiece, said head comprising:
    (a) a cylindrical body;
    (b) a boring bar disposed in said body and movable in eccentric relation to the medial axis of said body;
    (c) a cutting tool secured to said bar;
    (d) a disc axially connected to said bar;
    (e) an eccentric pintle in said disc;
    (f) a segmental plate pivotally mounted in said head and having a slot therein for the reception of said pintle;
    (g) a lug on said disc; and,
    (h) a pair of spaced pins in said head disposed on opposed sides of said lug to delimit movement of said disc so that movement of said segmental plate relative to said body causes said bar to move eccentrically relative to said body between positions fixed by said spaced pins.

5. A boring tool comprising:
    (a) a hub rotatable about a central axis, said hub having a bore concentric to said central axis;
    (b) A sleeve journaled in said bore, said sleeve having a bore eccentrically located relative to said central axis;
    (c) a boring bar journaled in the eccentrically located bore;
    (d) an actuating plate pivotally connected to said hub and eccentrically connected to the bar by a slidable connection; and,
    (e) means to actuate said plate and cause the plate to bar connection to move around the axis of the bar and thereby rotate the bar eccentrically relative to the hub.

6. A driving head for supporting and driving a cutting tool, said driving head comprising:
   (a) a housing having a central axis of rotation;
   (b) a boring bar movably connected to said housing and rotatable about an axis of rotation which is spaced from said central axis of rotation;
   (c) the cutting tool being secured to said boring bar and movable eccentrically relative to said central axis of rotation when said boring bar is rotated around its axis relative to said housing;
   (d) an actuator plate;
   (e) a first connection between said actuator plate and said housing;
   (f) a second connection between said actuator plate and said bar at a point eccentrically relative to the axis of rotation of the bar;
   (g) both of said connections being movable so that the actuator plate is movable relative to both said hub and said bar;
   (h) at least one of said connections comprising a sliding connection; and,
   (i) means on said actuator plate for moving said plate and causing the second connection to move around the axis of rotation of the bar and thereby rotate the cutting tool eccentrically relative to the housing.

7. The combination of claim 6 including, in combination:
   (f) said housing and said bar including coacting stop portions to permit rotation of said bar relative to said housing only between fixed predetermined limits set by said stop portions;
   (g) said actuator plate having its center of mass located off-center of said central axis so that said actuator plate is centrifugally forced to move away from said central axis when said housing is rotating; and,
   (h) bias means interposed between said actuator plate and said housing and normally urging said actuator plate toward said central axis of rotation to position relative bar and housing rotation at one of said fixed limits when the housing is rotating below a predetermined speed, and said bias means resisting centrifugal movement of said actuator plate until said housing is rotating above said predetermined speed in which event the actuator plate moves away from said central axis to position relative bar and housing rotation at the other of said fixed limits.

8. A driving head for supporting and driving a cutting tool, said driving head comprising:
   (a) a housing having a central axis of rotation;
   (b) a boring bar movably connected to said housing and rotatable about an axis of rotation which is spaced from said central axis of rotation;
   (c) the cutting tool being secured to said boring bar and movable eccentrically relative to said central axis of rotation when said boring bar is rotated relative to said housing;
   (d) an actuator plate being movably connected to said housing so that rotation of said housing centrifugally forces said actuator plate to move toward a position away from said central axis of rotation;
   (e) bias means urging said actuator plate toward a position near said central axis of rotation; and,
   (f) means slidably connecting said actuator plate to said boring bar at a position off-center of said axis of rotation of the bar so as to rotate said boring bar between fixed limits relative to said housing when said actuator plate moves between said positions near and away from said central axis of rotation.

9. A driving head for supporting and driving a cutting tool, said driving head comprising:
   (a) a housing member having a central axis of rotation;
   (b) a boring bar member movably connected to said housing and rotatable around an axis of rotation which is spaced from said central axis of rotation;
   (c) said cutting tool being secured to said bar member and movable eccentrically relative to said central axis of rotation when said bar member is rotated relative to said housing member;
   (d) lug means on one of said members engageable with angularly spaced stop means on the other of said members to permit rotation of said boring bar member relative to said housing member only between predetermined limits as fixed by said spaced stop means;
   (e) an actuator plate pivotally connected to said housing member so that rotation of said housing member centrifugally forces said actuator plate to move from a position near said central axis of rotation to a position away from said central axis of rotation;
   (f) bias means being operatively interposed between said actuator plate and said housing member and resisting movement of said actuator plate toward said position away from the central axis of rotation;
   (g) a pintle and slot connection between said actuator plate and said bar member at a position off center of said axis of rotation of the bar so as to rotate said bar member between said predetermined limits when said actuator plate is moving between said near and away positions; and,
   (h) said actuator plate being normally in said near position as urged by said bias means, and said actuator plate moving to said away position only when said housing is rotating at a predetermined speed such that the centrifugal force is sufficient to overcome the resisting force of said bias means.

References Cited by the Examiner

UNITED STATES PATENTS 2,058,359 10/1936 Schmidt.
2,278,845 4/1942 Giern et al.
2,833,169 5/1958 Briney et al.

WILLIAM W. DYER, Jr., *Primary Examiner.*